(12) United States Patent
Oakes

(10) Patent No.: US 11,843,205 B2
(45) Date of Patent: Dec. 12, 2023

(54) SMART CONNECTOR ASSEMBLY

(71) Applicant: Cummins Inc., Columbus, IN (US)

(72) Inventor: Jeffrey L. Oakes, Columbus, IN (US)

(73) Assignee: Cummins Inc., Columbus, IN (US)

( * ) Notice: Subject to any disclaimer, the term of this patent is extended or adjusted under 35 U.S.C. 154(b) by 77 days.

(21) Appl. No.: 17/321,881

(22) Filed: May 17, 2021

(65) Prior Publication Data

US 2021/0273383 A1 Sep. 2, 2021

Related U.S. Application Data

(63) Continuation of application No. 16/838,215, filed on Apr. 2, 2020, now Pat. No. 11,031,741, which is a
(Continued)

(51) Int. Cl.
*H01R 13/625* (2006.01)
*H01R 13/66* (2006.01)
(Continued)

(52) U.S. Cl.
CPC ..... *H01R 13/6691* (2013.01); *B60R 16/0207* (2013.01); *H01R 13/05* (2013.01);
(Continued)

(58) Field of Classification Search
CPC ...... H01R 13/15; H01R 13/50; H01R 13/625; H01R 13/6691; H01R 2201/26;
(Continued)

(56) References Cited

U.S. PATENT DOCUMENTS

| 4,393,834 A | 7/1983 | Doherty, Jr. |
| 4,506,943 A | 3/1985 | Drogo |

(Continued)

FOREIGN PATENT DOCUMENTS

| CN | 106463860 A | 8/2019 |
| EP | 1715460 A2 | 8/2007 |

(Continued)

OTHER PUBLICATIONS

Search Report and Written Opinion, PCT Appln. No. PCT/US18/45806, 9 pgs. dated Oct. 24, 2018. dated Oct. 24, 2018.

(Continued)

*Primary Examiner* — Abdullah A Riyami
*Assistant Examiner* — Vladimir Imas
(74) *Attorney, Agent, or Firm* — Taft, Stettinius & Hollister LLP

(57) ABSTRACT

A connector assembly is disclosed that includes a base with an embedded printed circuit board (PCB) and a plurality of signal pins. The plurality of signal pins electrically couple the PCB to a vehicle harness. The connector assembly includes a mating connector for mechanically coupling the connect assembly to the vehicle harness and a spring between the mating connector and the base. The spring pre-loads and axially secures the base to the mating connector. The connector assembly transmits vehicle signals through a wireless connection with vehicle and/or remote locations.

20 Claims, 5 Drawing Sheets

Related U.S. Application Data continuation of application No. PCT/US2018/045806, filed on Aug. 8, 2018.

(60) Provisional application No. 62/578,770, filed on Oct. 30, 2017.

(51) Int. Cl.

| | | |
|---|---|---|
| *H04W 4/40* | (2018.01) | |
| *B60R 16/02* | (2006.01) | |
| *H01R 13/15* | (2006.01) | |
| *H01R 13/05* | (2006.01) | |
| *H04W 4/80* | (2018.01) | |
| *B60R 16/023* | (2006.01) | |
| *H04W 84/04* | (2009.01) | |
| *H04W 84/12* | (2009.01) | |

(52) U.S. Cl.
CPC .......... *H01R 13/15* (2013.01); *H01R 13/625* (2013.01); *H04W 4/40* (2018.02); *B60R 16/0231* (2013.01); *H01R 2201/26* (2013.01); *H04W 4/80* (2018.02); *H04W 84/042* (2013.01); *H04W 84/12* (2013.01)

(58) Field of Classification Search
CPC .. B60R 16/0207; B60R 16/0231; H04W 4/80; H04W 84/042; H04W 84/12; H04W 4/40
USPC ......................................................... 439/332
See application file for complete search history.

(56) References Cited

U.S. PATENT DOCUMENTS

| | | | |
|---|---|---|---|
| 5,141,448 A | 8/1992 | Mattingly et al. | |
| 5,473,809 A | 12/1995 | DuRocher et al. | |
| 5,590,228 A | 12/1996 | Gibola et al. | |
| 6,203,349 B1 | 3/2001 | Nakazawa | |
| 6,226,068 B1 | 5/2001 | Arcykiewicz et al. | |
| 6,336,822 B1 | 1/2002 | Lizzoli | |
| 6,364,681 B1 | 4/2002 | Watanabe | |
| 6,444,929 B1 | 9/2002 | Schwartz et al. | |
| 6,642,628 B2 | 11/2003 | Burdick et al. | |
| 6,666,701 B1 | 12/2003 | Burkhardt et al. | |
| 6,685,493 B2* | 2/2004 | Birkenmaier | H01R 13/745 439/562 |
| 6,719,578 B1* | 4/2004 | Klassen | H01R 13/523 439/20 |
| 6,956,501 B2 | 10/2005 | Kitson | |
| 7,447,574 B1 | 11/2008 | Washicko et al. | |
| 7,584,030 B1* | 9/2009 | Graham | H01R 13/665 701/33.2 |
| 7,922,511 B1* | 4/2011 | Schweitzer | H01R 13/622 439/314 |
| 8,078,339 B2 | 12/2011 | Oakes | |
| 8,405,500 B2 | 3/2013 | Lammers et al. | |
| 8,612,086 B2 | 12/2013 | Jardine | |
| 8,786,412 B2 | 7/2014 | Ebrom et al. | |
| 8,854,947 B2 | 10/2014 | Jackson et al. | |
| 9,246,288 B2 | 1/2016 | Jones | |
| 9,438,051 B2* | 9/2016 | Firman, II | H01R 31/065 |
| 9,930,796 B2 | 3/2018 | Fantin et al. | |
| 9,974,143 B2* | 5/2018 | Stuby, Jr. | H01R 13/6683 |
| 10,033,130 B2* | 7/2018 | Wali | H01R 13/622 |
| 10,037,633 B2* | 7/2018 | Gintz | H04W 4/48 |
| 10,096,183 B2* | 10/2018 | Nitu | G07F 9/001 |
| 10,119,886 B2* | 11/2018 | Dhingra | B01D 46/429 |
| 10,467,828 B2 | 11/2019 | Lightner et al. | |
| 10,573,093 B2 | 2/2020 | Breed | |
| 10,608,394 B2* | 3/2020 | Cusick | H01R 13/629 |
| 10,639,951 B2 | 5/2020 | Gonzalez Juanes et al. | |
| 10,647,369 B2 | 5/2020 | Weaver et al. | |
| 11,341,800 B2* | 5/2022 | Nitu | G07C 9/00904 |
| 2006/0235586 A1 | 10/2006 | Waszkowski et al. | |
| 2011/0070780 A1* | 3/2011 | Schweitzer | H01R 13/625 439/668 |
| 2011/0270485 A1 | 11/2011 | Jones | |
| 2012/0037725 A1* | 2/2012 | Verfuerth | A01G 25/16 239/289 |
| 2012/0139426 A1* | 6/2012 | Ilyes | H05B 47/11 362/458 |
| 2014/0011483 A1 | 1/2014 | Baumert et al. | |
| 2015/0124100 A1* | 5/2015 | McRory | H04N 23/50 348/151 |
| 2015/0282282 A1* | 10/2015 | Breuer | H04M 1/72415 315/152 |
| 2016/0047537 A1* | 2/2016 | Stolte | F21V 23/009 362/276 |
| 2016/0103016 A1* | 4/2016 | Weber | F21V 23/0464 250/227.11 |
| 2017/0309085 A1* | 10/2017 | Elliott | H04W 4/48 |
| 2020/0132000 A1* | 4/2020 | Williams | F02D 11/105 |
| 2020/0251864 A1* | 8/2020 | Baker | B60R 16/0207 |

FOREIGN PATENT DOCUMENTS

| | | |
|---|---|---|
| WO | 2003067714 A1 | 8/2003 |
| WO | 2014191557 A1 | 12/2014 |
| WO | 2018053309 | 3/2018 |

OTHER PUBLICATIONS

European Extended Search Report, EP Appln. No. 18874548.3, dated Jul. 15, 2021, 7 pgs.
Chinese Office Action, Chinese Appln. No. 201880070864.7, 11 pgs., dated Feb. 11, 2023.
Chinese Office Action, Chinese Appln. No. 201880070864.7, 11 pgs., dated Aug. 25, 2023.
European Article 94 Communication, EP Appln. No. 18874548.3, dated Jun. 20, 2023, 5 pgs.

* cited by examiner

SMART CONNECTOR ASSEMBLY

CROSS-REFERENCE TO RELATED APPLICATIONS

The present application is a continuation of U.S. application Ser. No. 16/838,215 filed on Apr. 2, 2020, which is a continuation of PCT Patent Application No. PCT/US18/45806 filed on Aug. 8, 2018, which claims the benefit of the filing date of U.S. Provisional Application Ser. No. 62/578,770 filed on Oct. 30, 2017, each of which is incorporated herein by reference in its entirety.

FIELD OF THE INVENTION

The present invention generally relates to vehicle control devices, and more particularly to integrated removable connectors and related mounting hardware for removably connecting circuits to a vehicle control system.

BACKGROUND

Vehicles systems generate electric signals transmitted to and/or from an ECU and/or other controllers via a vehicle wiring harness. These signals may provide vehicle performance information and alerts to vehicle driver and/or maintenance staff of vehicle system health. However, many times this information is not considered until an incident occurs, for example, low oil level causing poor vehicle performance, and in some instances prime mover failure. Existing systems and devices suffer various shortcomings for providing real-time monitoring of vehicle signals by vehicle driver and/or remote locations.

SUMMARY

An integrated connector assembly is disclosed herein. In one embodiment, the connector assembly for integrating with a vehicle signal harness is disclosed. The connector assembly may supply distributive processing capability with wireless connectivity. The connector assembly includes a base with an embedded printed circuit board (PCB) and a plurality of signal pins. The plurality of signal pins electrically couples the PCB to a vehicle harness. The connector assembly may include a mating connector for mechanically coupling the connector assembly to the vehicle harness and a spring between the mating connector and the base. The spring pre-loads and axially secures the base to the mating connector, the spring may be, for example, a wave spring washer.

The mating connector may be configured to lock with the vehicle harness, that may, for example, connect to an oil level sensor signal. The connector assembly may include an insulator positioned between the base and the mating connector. The insulator may be configured to receiving the plurality of signal pins therethrough. The connector assembly may include a wireless connection between the connector assembly and a plurality of receivers. The wireless connection may include at least one of Bluetooth and telematic connections.

The base of the connector assembly may define a plurality of axially extending passageways to receive the plurality of signal pins. The base may include a circumferential slot and the mating connector may include an inner radial groove that aligns with the circumferential slot to receive the spring therebetween. The base may include a first body portion to houses the PCB, a second body portion extending axially from the first body portion, and a third body portion extending axially from the second body portion. The mating connector may be positioned around the second and third body portions.

The third body portion may have a reduced diameter in comparison with the second body portion, and the third body portion may include a plurality of axially extending ribs extending along an outer surface of the third body portion. The third body portion may include a radially extending flange projecting outwardly from the outer surface of the third body portion, the flange and the second body portion may define a circumferential slot therebetween for receiving the spring.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
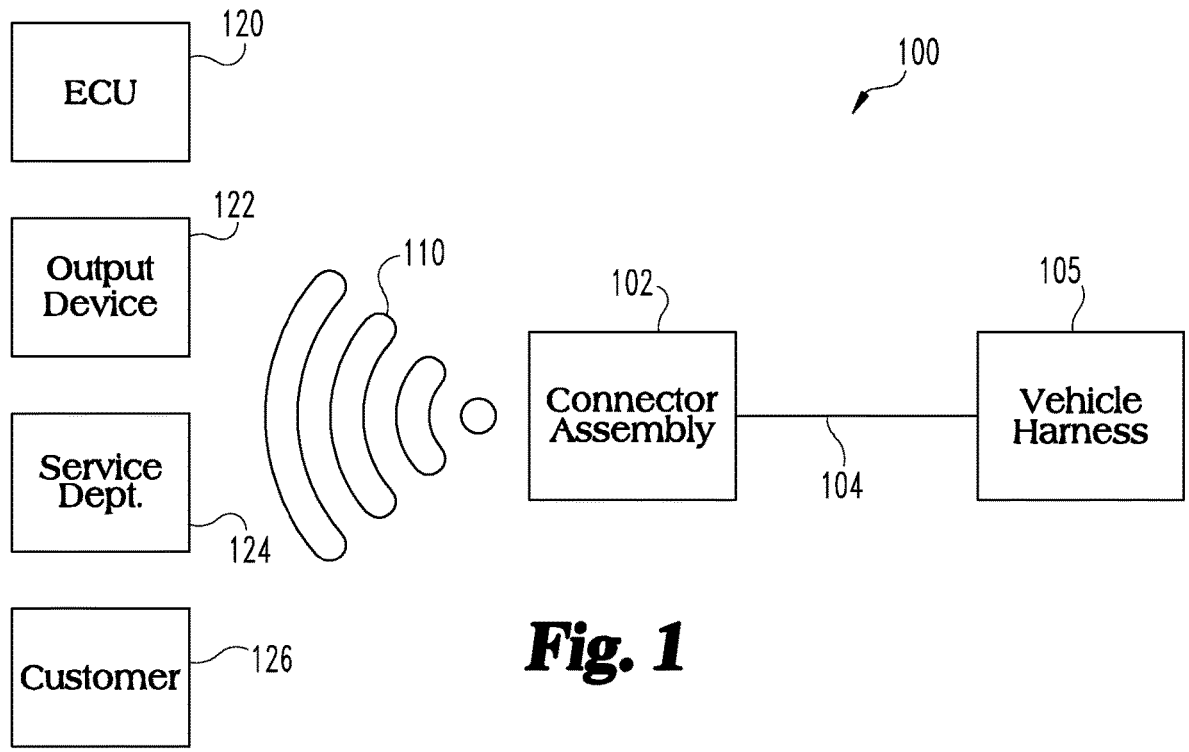
FIG. 1 is a block diagram of an embodiment of a hardware configuration for the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is an illustration of an embodiment of a Smart Connector (SC) system 100. System 100 includes connector assembly 102, vehicle harness 105, and electric coupling 104. A wireless connection 110 transmits signals from connector assembly 102 to various remote users or systems of, for example, a vehicle. The remote systems or users of the vehicle may include, for example, the vehicle engine control unit (ECU) 120, one or more output devices 122 within or on the vehicle, a service department 124 that services the vehicle, an owner or customer 126, and various other remote locations and devices. Connector system 100 can be connected to, for example, a sensor or device of the vehicle to collect, store and wirelessly transmit the data to the remote systems and/or users using Bluetooth, WiFi, cellular, and/or any other suitable wireless or telematics protocol or connection.

Figure 2:
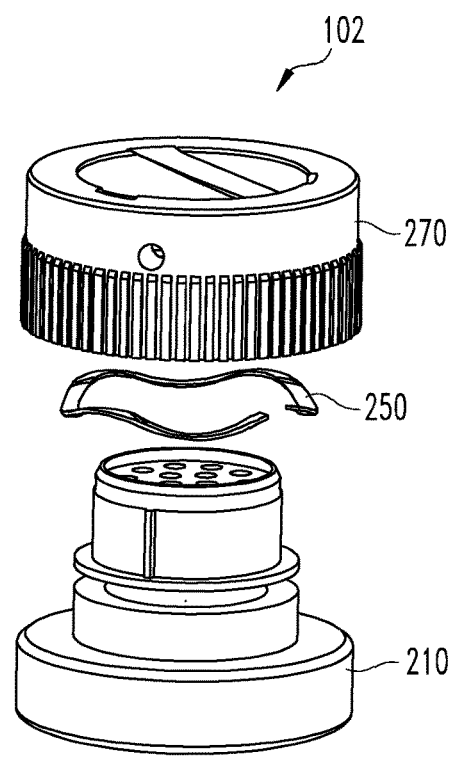
FIG. 2 is an exploded view of an embodiment of a connector assembly for the present disclosure.

FIG. 2 is an illustration of an embodiment of connector assembly 102, which includes a base 210, a wave spring 250, and a mating connector 270, shown in an exploded view in FIG. 2. The base 210 may couple to the mating connector 270 with a pre-load locking mechanism, such as a wave spring 250 as discussed further below. The wave spring 250 may be located between base 210 and the mating connector 270. The wave spring 250 may be used for providing a pre-load to securely retain the mating connector 270 on the base 210. In other embodiments, any suitable pre-load member or mechanism is contemplated.

Figure 3:
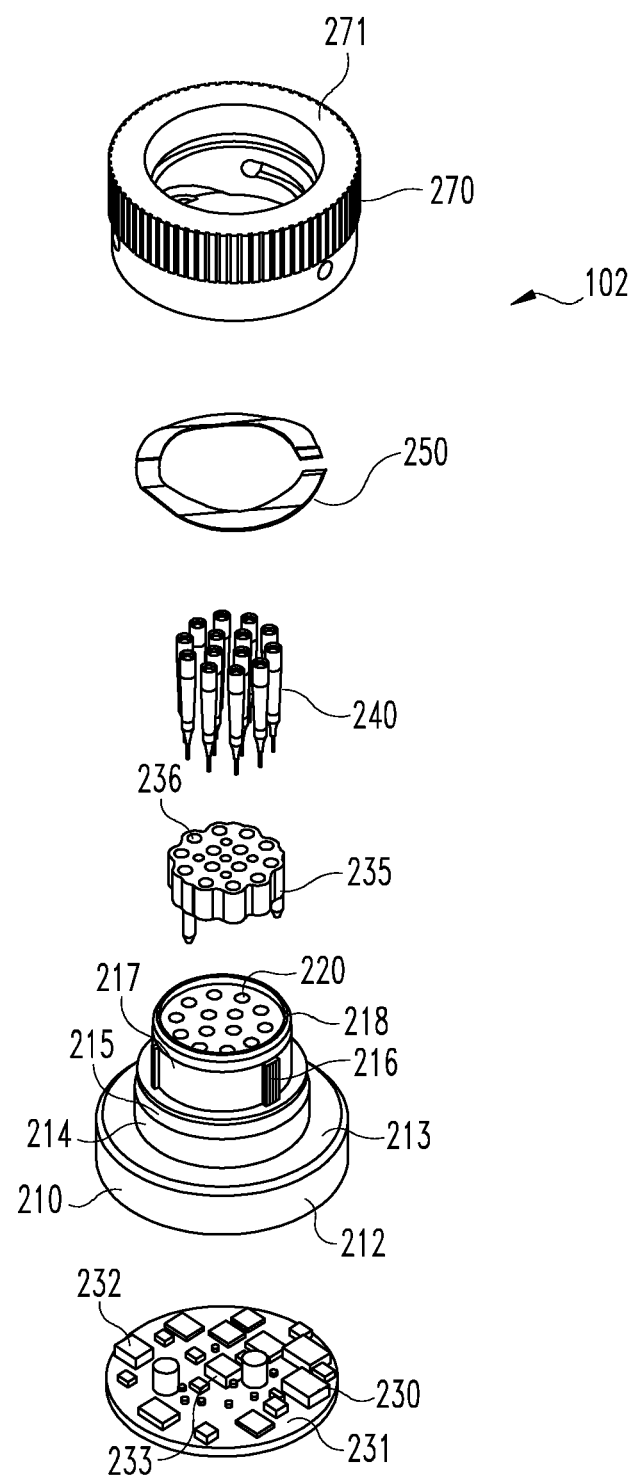
FIG. 3 is a further exploded view of connector assembly of FIG. 2.

FIG. 3 is a further exploded view of the connector assembly 102. The base 210 includes a first body portion 212 extending axially from an outer end to a first axially facing face 213, a second body portion 214 extending axially from first face 213, a second axially facing surface 215, a third body portion 217 extending axially from second face 215, a plurality of axially extending ribs 216 on an outer surface of third body portion 217, and a top surface 218 at an outer end of third body portion 217. The body portions 212, 214, 217 are cylindrically shaped in the illustrated embodiment, but other shapes are not precluded. Third body portion 217 has a reduced diameter as compared to second body portion 214. A printed circuit board (PCB) 230 with a plurality of surface mount components 232 is embedded in the base 210, and in particular in first body portion 212 between the outer end of first body portion 212 and the first face 213.

Third body portion 217 defines a plurality of holes 220 that open at top surface 218 and extend to PCB 230. The base 210 is overmolded around PCB 230 and separator or insulator 235, which houses pins 240 that are connected to PCB 230. Insulator 235 is positioned relative to base 210 at top surface 218. Insulator 235 also has a plurality of holes 236 that are configured for receiving a plurality of signal pins 240. Each of the plurality of signal pins 240, through electric coupling 104, receives signals from vehicle harness 105. PCB 230 includes a top surface 231 with a plurality of electrical contacts 233, that make electrical connection with the plurality of signal pins 240, when insulator 235 with the plurality of signal pins 240, is secured to base 210 adjacent to the top surface 218, and the plurality of signal pins are inserted into holes 220.

Wave spring 250 includes a shape of an open-sided washer that is capable of being expanded and positioned around third body portion 217 of base 210 in the circumferential slot 225 (FIG. 4B) between second axially facing surface 215 of base 210 and radial flange 226. The body of wave spring 250 is resilient so that it snaps back to remain mounted around third body portion 217 within circumferential slot 225. Mating connector 270 initially couples to base 210 around top surface 218, and may be guided along the ribs 216 as mating connector 270 is advanced along third body portion 217. Mating connector 270 may be advanced along the third body portion 217 until bottom 271 of mating connector 270 is adjacent the first axially facing surface 213 and in contact with the wave spring 250 therebetween.

Figure 4A:
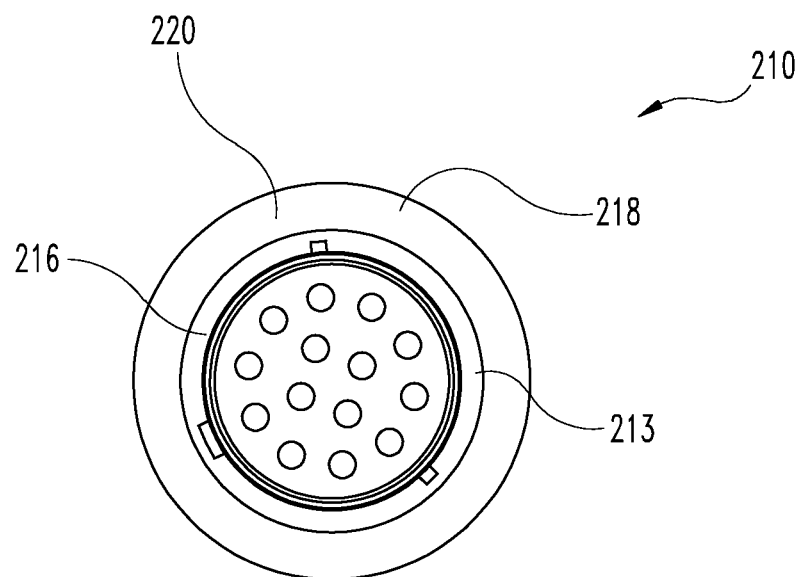
FIG. 4A is a top view of an embodiment of a base used with the connector assembly of FIG. 2.
Figure 4B:
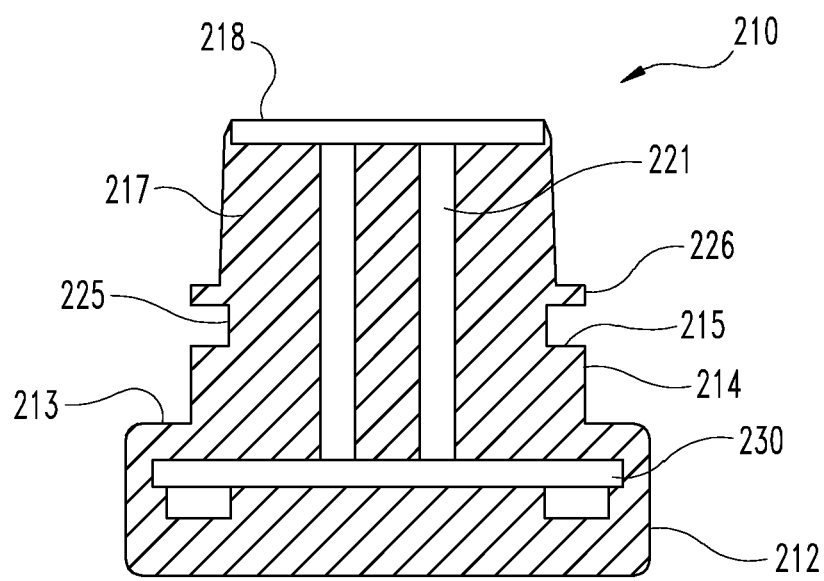
FIG. 4B is a cross sectional view of the base of FIG. 4A.

FIG. 4A is a top view of base 210 and FIG. 4B is a cross sectional view of base 210. The top surface 218 of base 210 is positioned adjacent to insulator 235 and the signal pins 240, with pins 240 being received in the plurality of holes 220. The second face 215 of base 210 is adjacent surface for bottom 271 of mating connector 270 when connector assembly 102 is fully assembled. The plurality of holes 220 are formed by molding insulator 235 around signal pins 240 and form a plurality of passage ways 221 that are configured to house signal pins 240. PCB 230 is embedded in first body portion 212 of base 210 between its outer end opposite top surface 218 and the first axially facing surface 213. The plurality of signal pins 240 are located within the plurality of holes 220 on top surface 218 and the plurality of passage ways 221, and contact the plurality of electrical contacts 233 on top surface 231 of PCB 230. A slot 225 extending around third body portion 217 that is formed between flange 226 and second axially facing surface 215 may be used to lock and axially secure base 210 and mating connector 270 together when connector assembly 102 is fully assembled and mating connector 270 is placed to a locked position on base 210.

Figure 5A:
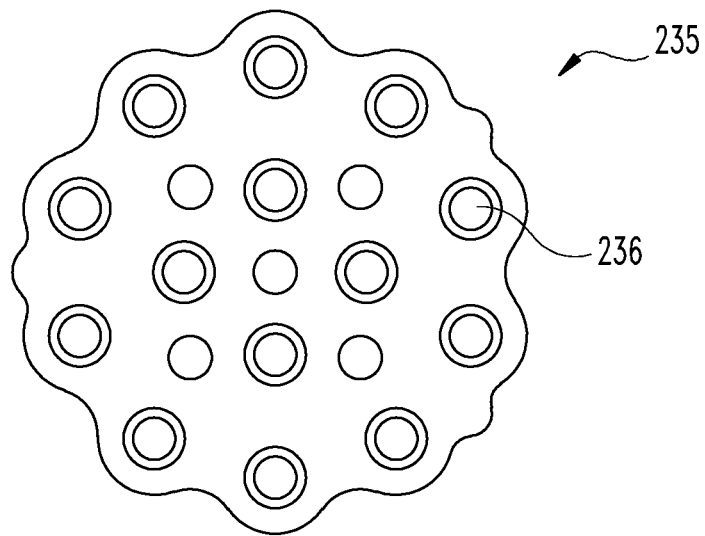
FIG. 5A is a top view of an embodiment of an insulator used with the connector assembly of FIG. 2.
Figure 5B:
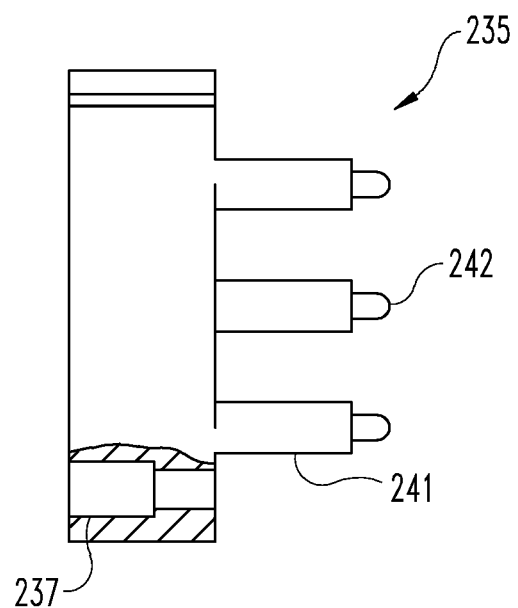
FIG. 5B is a partial cross-sectional view of the insulator of FIG. 5A.

FIG. 5A illustrates insulator 235, which includes holes 236 which align with holes 220 on top surface 218 of base 210. FIG. 5B is a cross-sectional view of insulator 235, which shows a plurality of passage ways 237 defined by the holes 236 for the plurality of signal pins 240. Insulator 235 may optionally include mounting legs 241 extending axially from its bottom surface to mounting leg ends 242 that engage with top surface 218 of base 210 to secure the insulator 235 to the base 210.

Figure 6A:
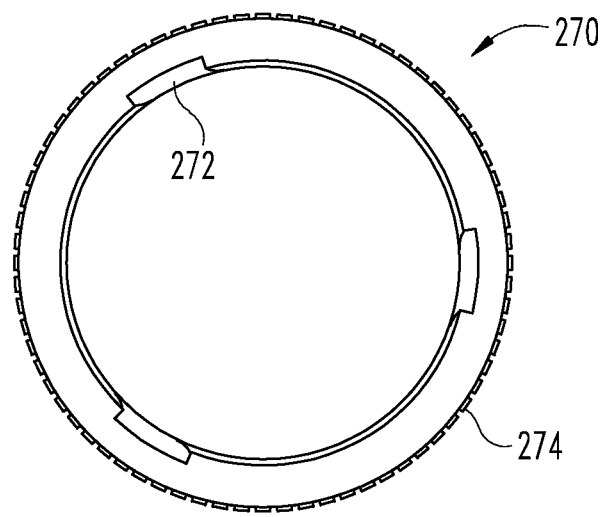
FIG. 6A is a top view of a mating connector used with the connector assembly of FIG. 2.

FIG. 6A is an illustration of a top view of mating connector 270, which includes a plurality of locating key slots 272 that align adjacent to a plurality of locating keys (not shown) on the vehicle harness 105 when mating connector 270 engages the vehicle harness 105. A plurality of gripping serration 274 may be positioned around the outer circumference of mating connector 270 to assist in mating connector 270 to base 210 and/or for twisting the connector assembly for engagement with the vehicle harness 105.

Figure 6B:
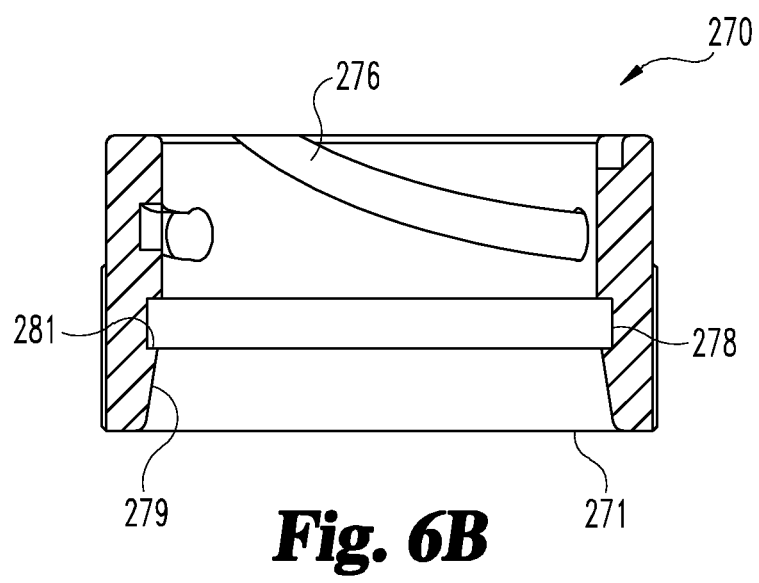
FIG. 6B is a cross-sectional view of an embodiment of the mating connector of FIG. 6A.

FIG. 6B is a cross-sectional view of a mating connector 270 showing a locking rotational groove 276. The locking rotational groove 276 is secured to a mating projecting (not shown) on the vehicle harness 105 to mechanically couple connector assembly 102 to the vehicle harness 105. Mating connection 270 also includes a tapered inner wall 279 that facilitates positioning over and compression of wave spring 250 as inner wall is slid along the wave spring 250 until wave spring 250 passes lip 281 and snaps into inner circumferential groove 278. When mating connector 270 engages with the third body portion 217 of base 210, the wave spring 250 is received in inner circumferential groove 278 of mating connector 270 and in the axially aligned circumferential slot 225 of base 210. Wave spring 250 thus axially secures the base 210 with the mating connector 217

The SC system 100 adds distributive processing power with wireless capability. The SC system 100 can be installed easily on the vehicle harness 105 and may reduce downtime as a result of the wireless connection 110 providing remote monitoring of one or more vehicle parameters such as, for example, oil level of an engine. The wireless connection 110, which may include Bluetooth, WiFi, cellular, or any other suitable telematic or wireless connection, provides real time information to users. For example, monitoring oil level electronically may reduce or prevent a driver of the vehicle from manually checking the oil. The connector assembly 102 may transmit signals to alert users when, for example, an oil overfill event or low oil level event has been detected. User may also be able to track oil consumption of a prime mover, and improve cost avoidance by ensuring vehicles have proper oil level. Another potential advantage, is high oil consumption may be addressed immediately rather than after an issue related to low oil level occurs.

The connector assembly 102 may attach to a vehicle harness at various locations on the vehicle, allowing for shorter installation and repair times. The connector assembly 102 may wirelessly communicate with a vehicle driver and/or maintenance operations via Bluetooth, WiFi, cellular, or another other suitable wireless and/or telematic connection, and perform additional electronic operations. For example, electronic oil level monitoring, determining oil filter life, calculating oil drain interval, or monitoring tire pressure may be performed by connector assembly 102.

The SC system 100 may mate with, for example, Deutsch® connector HDP24-18. In one embodiment, the mechanical interface on the locking mechanism and pin configuration complement the Deutsch® Quick Disconnect HDP26-18 connector. However, it should be understood that system 100 can mate with and/or complement any type of connector and/or disconnect.

The SC system 100 may be attached on a vehicle harness anywhere on a vehicle providing shorter installation and repair times. The SC system 100 may communicate with a vehicle driver, customer, and/or maintenance via Bluetooth, WiFi, cellular, or any suitable wireless or telematic connection, and perform other electronic functions. For example, some other electronic functions may include electronic oil level monitoring, determining oil filter life, calculating oil drain interval (ODI), and tire pressure monitoring.

Various aspects of the present disclosure are contemplated. According to one aspect, an apparatus includes a connector assembly. The connector assembly includes a base where the base includes an embedded PCB and a plurality of signal pins that electrically couple the PCB to a vehicle harness. The connector assembly further includes a mating connector for mechanically coupling the connect assembly to the vehicle harness and a releasable connection between the mating connector and the base. The releasable connection pre-loads and axially secures the base to the mating connector.

In one embodiment, the releasable connection is provided by a spring. In a refinement of this embodiment, the spring is a wave spring washer.

In another embodiment, the mating connector is configured to lock with the vehicle harness. In yet another embodiment, the vehicle harness is connected to an oil level sensor. In a further embodiment, the connector assembly further includes an insulator between the base and the mating connector, and the insulator is configured to receive the plurality of signal pins therethrough.

In one embodiment, there is a wireless connection between the connector assembly and a plurality of receivers. In a refinement of this embodiment, the wireless connection is one or more of a Bluetooth connection, WiFi connection, and a cellular connection. In another embodiment, the base defines a plurality of axially extending passageways that receive the plurality of signal pins.

In yet another embodiment, the base includes a circumferential slot and the mating connector includes an inner radial groove that aligns with the circumferential slot to receive a spring washer therebetween that forms at least a part of the releasable connection. In a refinement of this embodiment, the base includes a first body portion that houses the PCB, a second body portion extending axially from the first body portion, and a third body portion extending axially from the second body portion, and the mating connector is positioned around the second and the third body portions. In a further refinement of this embodiment, the third body portion has a reduced diameter in comparison with the second body portion, and the third body portion includes a plurality of axially extending ribs extending along an outer surface of the third body portion. In still a further refinement, the third body portion includes a radially extending flange projecting outwardly from the outer surface of the third body portion, the flange and the second body portion defining a circumferential slot therebetween for receiving the spring washer.

In another aspect of the present disclosure, a system is provided. The system includes a connector assembly including a base. The base includes an embedded PCB and a plurality of signal pins that electrically couple the PCB to a vehicle harness. The connector assembly further includes a mating connector for mechanically coupling the connector assembly to the vehicle harness and a releasable connection between the mating connector and the base. The releasable connection pre-loads and axially secures the base to the mating connector. The system further includes at least one receiver and a wireless connection between the connector assembly and the at least one receiver.

In one embodiment, the releasable connection is provided by a spring such as a wave spring washer. In another embodiment, the mating connector is configured to lock with the vehicle harness that is configured to connect to an oil level sensor. In another embodiment, the connector assembly further includes an insulator between the base and the mating connector that is configured to receive the plurality of signal pins therethrough.

In another embodiment, the wireless connection includes one or more of a Bluetooth connection, a WiFi connection, and a cellular connection. In yet another embodiment, the base defines a plurality of axially extending passageways that receive the plurality of signal pins and includes a first body portion that houses the PCB, a second body portion extending axially from the first body portion, and a third body portion extending axially from the second body portion, and the mating connector is positioned around the second and third body portions. In still another embodiment, the base includes a circumferential slot and the mating connector includes an inner radial groove that aligns with the circumferential slot to receive a spring washer therebetween that forms at least a part of the releasable connection.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A smart connector system, comprising:
    a vehicle harness for connection to a data collection device of a vehicle; and
    a connector assembly including a printed circuit board electrically coupled to the vehicle harness to receive vehicle parameter data collected by the data collection device, wherein the connector assembly includes a wireless connection for transmitting in real time data signals of the vehicle parameter data to one or more users or systems for remote monitoring of the vehicle parameter data, wherein the connector assembly further includes:
a base that houses the printed circuit board, the base including a plurality of passageways through the base to the printed circuit board;
an insulator mounted to the base, the insulator including a plurality of holes that align with the plurality of passageways of the base; and
a plurality of signal pins extending through aligned ones of the plurality of passageways and the plurality of holes, the plurality of signal pins electrically coupling the printed circuit board to the vehicle harness.

2. The system of claim 1, wherein the data collection device is a sensor of the vehicle and the signal pins receive signals from the vehicle harness including the data collected by the sensor.

3. The system of claim 1, wherein the one or more users or systems include an engine control unit of the vehicle.

4. The system of claim 1, wherein the one or more users or systems include a service department for servicing the vehicle.

5. The system of claim 1, wherein the one or more users or systems include a driver of the vehicle.

6. The system of claim 1, wherein the vehicle parameters data include at least one of an oil level, a filter life, an oil change interval, and a tire pressure.

7. The system of claim 1, wherein the wireless connection includes a Bluetooth connection.

8. The system of claim 1, wherein the wireless connection includes one of a WiFi connection and a cellular connection.

9. The system of claim 1, wherein the connector assembly includes:
the printed circuit board embedded in the base; and
the insulator mounted to the base, the insulator including mounting legs with mounting leg ends that engage the base to secure the insulator to the base.

10. The system of claim 1, wherein the connector assembly includes:
a mating connector for connection to the vehicle harness;
the base releasably secured to the mating connector; and
the plurality of signal pins extending through the base and the mating connector to electrically connect the printed circuit board to the vehicle harness.

11. The system of claim 1, wherein the connector assembly further includes a mating connector for mechanically coupling the connector assembly to the vehicle harness and a releasable connection between the mating connector and the base that houses the printed circuit board, wherein the releasable connection pre-loads and axially secures the base to the mating connector.

12. The system of claim 11, wherein the releasable connection includes a wave spring washer received in an aligned slot and groove of the mating connector and the base.

13. A smart connector system comprising:
a vehicle harness for connection to a data collection device of a vehicle that collects vehicle parameter data;
a mating connector mechanically coupled to the vehicle harness;
a base that includes an embedded printed circuit board, the base including a plurality of passageways extending through the base to the printed circuit board;
an insulator mounted to the base, the insulator including a plurality of holes that align with the plurality of passageways of the base;
a plurality of signal pins extending through aligned ones of the plurality of passageways and the plurality of holes, wherein the plurality of signal pins electrically couple the printed circuit board to the vehicle harness;
a releasable connection between the mating connector and the base;
at least one remote receiver; and
a wireless connection with the at least one remote receiver for transmitting in real time the vehicle parameter data for remote monitoring of the vehicle parameter data.

14. The system of claim 13, wherein data collection device is a sensor and the signal pins receive signals from the vehicle harness including the data collected by the sensor.

15. The system of claim 13, wherein the wireless connection includes one or more of a Bluetooth connection, a WiFi connection, and a cellular connection.

16. The system of claim 13, wherein the at least one remote receiver includes at least one of an engine control unit of the vehicle, a service department for servicing the vehicle, and a driver of the vehicle.

17. The system of claim 13, wherein the vehicle parameter data includes at least one of an oil level, a filter life, an oil change interval, and a tire pressure.

18. The system of claim 13, wherein the base includes a circumferential slot and the mating connector includes an inner radial groove that aligns with the circumferential slot to receive a spring washer therebetween that forms at least a part of the releasable connection.

19. The system of claim 13, wherein the insulator includes mounting legs with mounting leg ends that engage the base to secure the insulator to the base.

20. A smart connector system, comprising:
a plurality of sensors for data collection associated with operation of an engine; and
a connector assembly to receive data collected by the plurality of sensors and to communicate with one or more users or systems, the connector assembly including a wireless connection for communicating with the plurality of sensors, the connector assembly further including a printed circuit board electrically coupled to a wiring harness, wherein the connector assembly further includes:
a base that houses the printed circuit board;
an insulator mounted to the base; and
a plurality of signal pins extending through the insulator and the base, the plurality of signal pins making electrical contact with the printed circuit board to electrically couple the printed circuit board to the wiring harness, the plurality of signal pins receiving signals from the wiring harness including the data collected by the plurality of sensors.

* * * * *